United States Patent [19]
Katsume et al.

[11] 3,874,167
[45] Apr. 1, 1975

[54] GAS TURBINE CONTROL WITH FUEL SHUT-OFF AND IGNITION UPON DECELERATION

[75] Inventors: Tetsuo Katsume; Toshihiro Horiuchi, both of Yokosuka, Japan

[73] Assignee: Nissan Motor Company Limited, Yokohama, Japan

[22] Filed: Jan. 16, 1974

[21] Appl. No.: 433,790

[30] Foreign Application Priority Data
Jan. 17, 1973   Japan................................. 48-7702

[52] U.S. Cl........... 60/39.28 R, 60/39.09 R, 60/223
[51] Int. Cl. ............................................. F02c 9/04
[58] Field of Search............ 60/39.09, 223, 39.28 R, 60/39.14

[56]  References Cited
 UNITED STATES PATENTS

| | | | |
|---|---|---|---|
| 3,765,176 | 10/1973 | Nelson et al.......................... | 60/223 |
| 3,777,480 | 12/1973 | Stoltman........................ | 60/39.28 R |
| 3,805,517 | 4/1974 | Sewell et al.................... | 60/39.28 R |
| 3,830,055 | 8/1974 | Erlund ........................... | 60/39.28 R |

*Primary Examiner*—C. J. Husar
*Assistant Examiner*—Warren Olsen

[57]  ABSTRACT

A fuel shut-off signal is generated if the rotational speed of a gas producer shaft is above a certain value and an accelerator pedal is not depressed beyond a certain point, indicating a deceleration demand condition. An ignition signal to restart the engine is also generated and the fuel shut-off signal is terminated when the deceleration demand condition is removed.

2 Claims, 3 Drawing Figures

GAS TURBINE CONTROL WITH FUEL SHUT-OFF AND IGNITION UPON DECELERATION

This present invention relates to a control device for a two-shaft gas turbine engine for a motor vehicle.

Conventionally, when a gas turbine engine is started, fuel in the combustor is ignited by sparks provided by an ignition system until combustion is initiated, and during operation, combustion within the combustor is sustained by a continuous supply of fuel without supplementary ignition.

Hence, it has been common practice in a conventional control device to supply fuel throughout all operating conditions of the engine and to deenergize the ignition system except when starting the engine. There is a drawback in such a conventional control device in that fuel must be supplied into the combustor of the engine even during deceleration to sustain combustion within the combustor causing sluggish response of the engine to a deceleration demand. The fact that fuel is supplied during deceleration is also unfavourable because of more toxic compounds in exhaust gas and lower fuel economy as compared with conventional motor vehicle piston internal combustion engines.

It is accordingly an object of the present invention to provide a control device for a two-shaft gas turbine engine for a motor vehicle which improves the response of the gas turbine engine to a deceleration demand without affecting the performance of the engine during other operating conditions.

It is a further object of the present invention to provide a control device for a two-shaft gas turbine engine for a motor vehicle which shuts off the supply of fuel to the combustor of the engine during deceleration and energizes an ignition system to provide sparks to ignite fuel in the combustor to resume combustion within the combustor after termination of the deceleration condition.

It is another object of the present invention to provide an electric control device for a two-shaft gas turbine engine for a motor vehicle.

These and other objects, features and advantages of the present invention will become clear from the following description in connection with the accompanying drawing, wherein.

Figure 1:
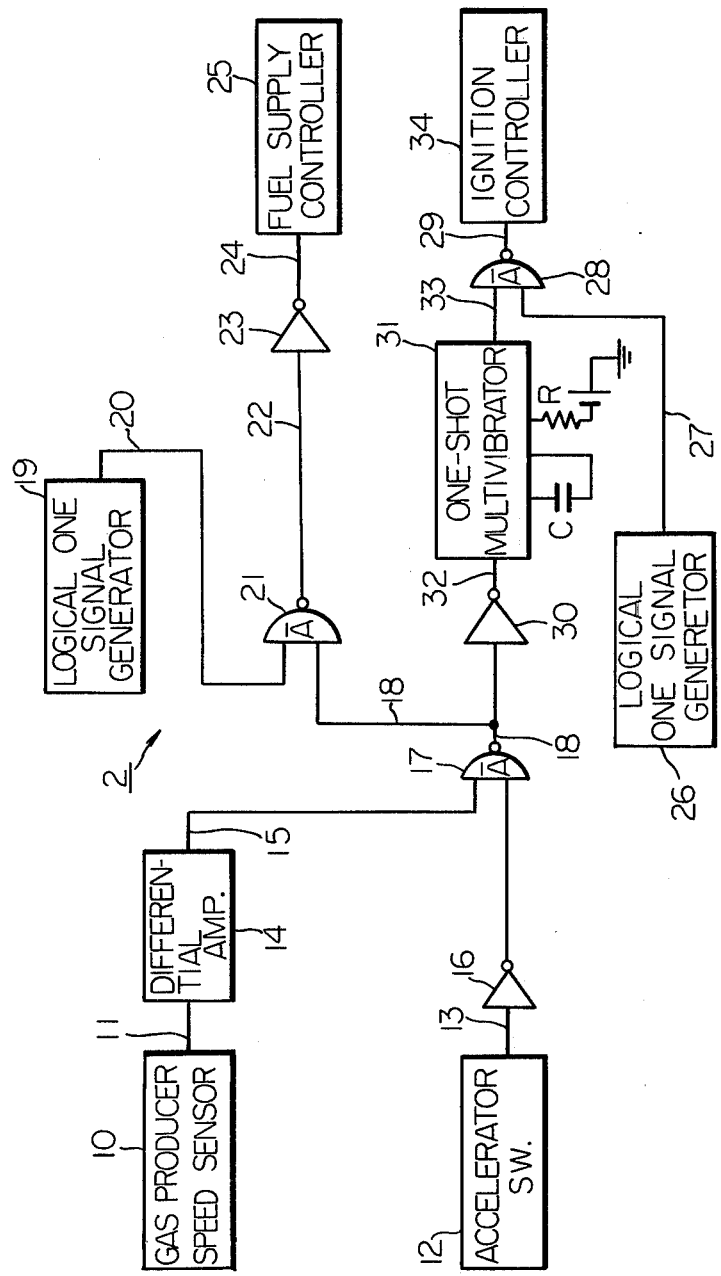
FIG. 1 is a schematic diagram of one embodiment of a control device of the present invention.

Referring to the accompanying drawings and particularly to FIG. 1 thereof, there is shown a schematic diagram of one embodiment of a control device of the present invention. The control device senses the rotational speed of a gas producer shaft (not shown) of a two-shaft gas turbine engine by means of a gas producer speed sensor 10 and the engine speed demand of a vehicle operator with an accelerator switch 12. It is to be understood that the gas producer speed sensor 10 feeds through a line 11 a signal representing the speed of a gas producer shaft, or a gas producer speed signal. The accelerator switch 12 is operatively connected with a manual engine speed control member such as an accelerator pedal (not shown) of the gas turbine engine, is normally open, and closes to feed a logical one level signal through a line 13 if the position of the accelerator pedal corresponds to an engine speed above a second predetermined value. The gas producer speed signal from the line 11 is fed into a differential amplifier 14 which is utilized to compare the gas producer speed signal with a predetermined speed signal to provide an output through a line 15. The output of the differential amplifier 14 is normally logical zero and switches to logical one if the gas producer speed is above a first predetermined value. Preferably, the first predetermined value should be 25,000 rpm, with a gas producer having a maximum shaft speed of 40,000 rpm and an idling speed of 20,000 rpm. On the other hand, the output from the accelerator switch 12 is inverted by an inverter 16. The output signal from the inverter 16 and the output signal from the differential amplifier 14 are fed into an input of a logical comparator 2, here shown as a NAND gate 17.

The NAND gate 17 procuces a logical zero output signal if both input signals are logical one, and a logical one output signal otherwise. The output signal from the NAND gate 17 is fed through a line 18 to a NAND gate 21, the other input of which is at all times a logical one signal from a signal generator 19 fed through a line 20. The output of the NAND gate 21 fed through a line 22 is inverted by an inverter 23. The signal on the line 22 is normally logical zero and switches to logical one if the gas producer shaft speed is above the first predetermined value and the accelerator pedal is moved to a position corresponding to an engine speed below the second predetermined value, since the signal on the line 18 switches to logical zero. It will be understood that the signal on the line 24, which is called a fuel shut-off signal, is normally logical one and switches to logical zero when the gas turbine engine has entered a deceleration demand condition.

A control device of the present invention is adapted to be utilized with a fuel supply controller 25 which is designed to shut off the fuel supply to the combustor (not shown) of the gas turbine engine if a logical zero signal is fed thereinto through the line 24. A fuel supply controller 25 with the above characteristics may be easily designed by those skilled in the art and does not form a part of the present invention, and a detailed description thereof is omitted.

Figures 2A, 2B:
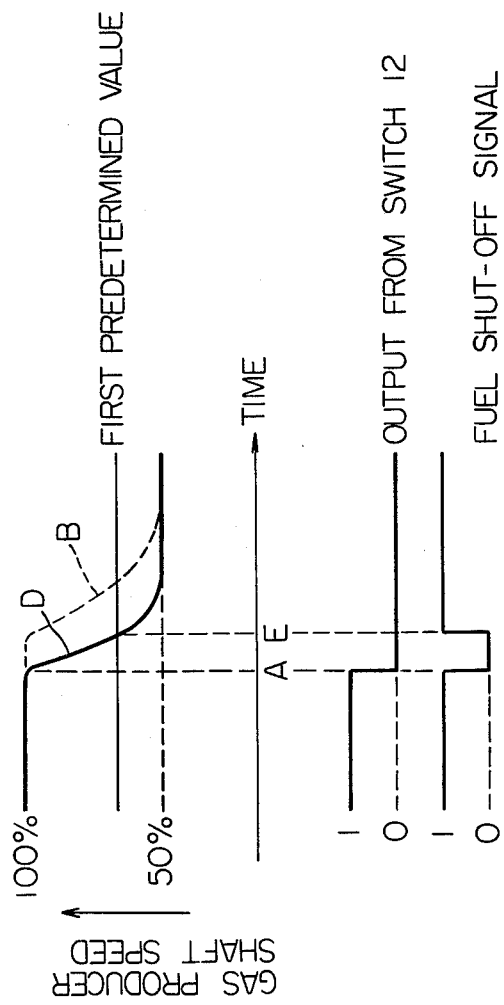
FIG. 2a is a graphical representation of the deceleration characteristics of the invention.
FIG. 2b illustrates the timing of signals used in the control device shown in FIG. 1.

From the foregoing description it will be understood that the supply of fuel to the combustor will be shut off during deceleration of the gas turbine engine. The fuel shut-off condition is maintained as long as the accelerator pedal is in a position coresponding to a speed below the second predetermined value and the gas producer shaft speed is above the first predetermined value. It will also be understood that this condition ends when the gas producer shaft speed drops below the first predetermined value or the accelerator pedal is depressed to demand an engine speed above the second predetermined value, and supply of fuel to the combustor is resumed. Referring also to FIGS. 2a and 2b, the gas producer shaft speed falls more sharply from an initial deceleration demand time A (as shown by a curve D) using a device of the invention than with a conventional gas turbine engine (curve B).

Referring again to the NAND gate 17, its output is inverted by an inverter 30 and fed to a one-shot multivibrator 31 through a line 32. The multivibrator 31 is designed to produce a logical one signal for a predetermined period of time T (determined by a time constant circuit comprising a resistor R and capacitor C) after the signal on the line 32 switches from logical zero to logical one. The time T should extend beyond a point E (see FIGS. 2a and 2b) by a sufficient duration enabling the ignition system to restore combustion within the combustor. The output signal on the line 33 is fed to a NAND gate 28, the other input of which is at all times fed a logical one signal from a signal generator 26 through a line 27. It is to be noted that the input signal to the multivibrator 31 switches from logical zero to logical one upon release of the accelerator pedal to demand a speed below the second predetermined value with the gas producer shaft speed above the first predetermined value to trigger the multivibrator 31.

Referring to the NAND gate 28, a logical one input signal will create a logical zero output signal, and other conditions will create a logical one output signal. It will be understood that the output signal from the NAND gate 28, which is called an ignition signal, lasts for the time T as shown in FIG. 2b. The ignition signal is fed through a line 29 to an ignition controller 34.

The ingition controller 34 is designed to cause sparks to be generated to ignite fuel in the combustor in response to a logical zero input. A detailed description of the ignition controller 34 is omitted since it may be easily designed by those skilled in the art and does not form any part of the present invention.

It will be appreciated from the preceding description that with a control device of the invention, upon deceleration, the supply of fuel to the combustor is shut off during a period between points A and E (see FIGS. 2a and 2b), and ignition is initiated at the point A for the time T.

It will be noted that initiation of the ignition signal does not have to correspond to the point A, but may be delayed if desired using a suitable delay circuit disposed in the line 32.

What is claimed is:

1. A control device for a two-shaft gas turbine engine responsive to the rotational speed of an engine gas producer shaft and the position of a manual engine speed control member;

said control device being operative to generate a fuel shut-off signal when said rotational speed is above a first predetermined value and said position corresponds to an engine speed below a second predetermined value indicating a deceleration demand condition of the engine;

said control device being further operative to generate an ignition signal for a predetermined period of time after at least one of said rotational speed drops below said first predetermined value and said position is manually changed to correspond to an engine speed above said second predetermined value after said deceleration demand condition.

2. A control device as claimed in claim 1, which comprises a logical comparator to determine when the engine is in said deceleration demand condition and a one-shot multivibrator to generate said ignition signal for said predetermined period of time.

* * * * *